Figure 1:
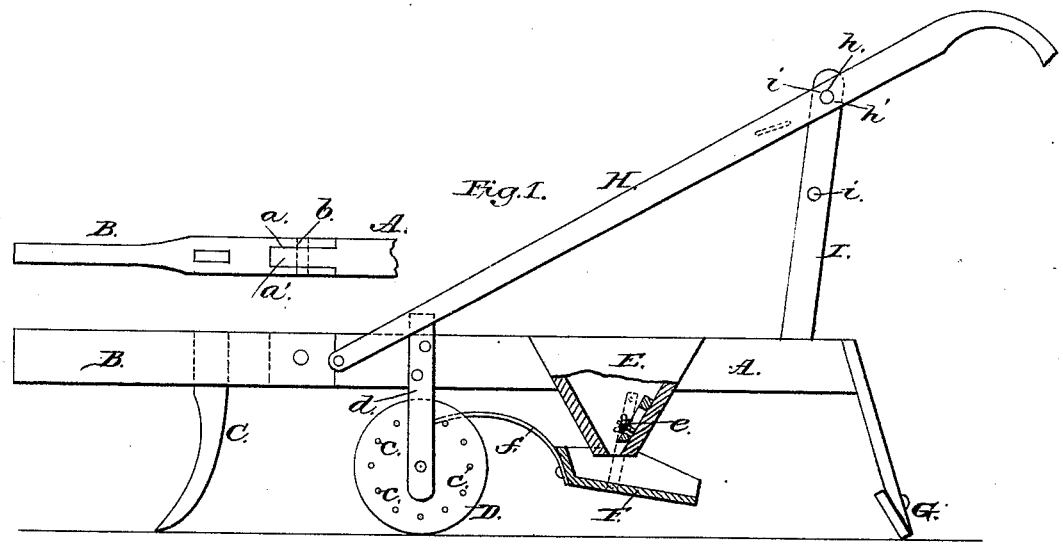

E. P. HOLLIS.
Seed-Drill and Fertilizer-Distributer.

No. 213,656.   Patented Mar. 25, 1879.

WITNESSES

INVENTOR
E. P. Hollis,
By H. J. Ennis
ATTORNEY

UNITED STATES PATENT OFFICE.

ELIJAH P. HOLLIS, OF GAFFNEY CITY, SOUTH CAROLINA.

IMPROVEMENT IN SEED-DRILL AND FERTILIZER-DISTRIBUTER.

Specification forming part of Letters Patent No. 213,656, dated March 25, 1879; application filed February 10, 1879.

*To all whom it may concern:*

Be it known that I, ELIJAH P. HOLLIS, of Gaffney City, in the county of Spartansburg and State of South Carolina, have invented certain new and useful Improvements in Seed-Drill and Fertilizer-Distributer; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to improvements in the class of machines which can be readily adapted for seed-drills or fertilizer-distributers; and the invention consists in the general construction and arrangement of parts, all as will be hereinafter fully described, and pointed out in the claim.

To enable others skilled in the art to make and use my invention, I will now proceed to describe the exact manner in which it is carried out.

In the drawings, A represents a longitudinal beam, upon which the several operating parts of the machine are mounted, said beam being provided with a detachable extension, B, provided with a furrow-opener, C, the beam and extension being, respectively, provided with a mortise and tenon, $a$ $a'$, for connecting them together, and secured by a transverse bolt, $b$. D represents the usual ground-wheel, journaled in the lower ends of the standards $d$, secured to the beam A; and E represents the hopper, centrally secured to the beam A, which passes longitudinally through the upper portion thereof.

Suspended from the hopper is a shoe, F, provided with curved arms $f f$, which engage with the pins $c c$ on opposite sides of the wheel D, and through the medium of which the shoe is vibrated as the ground-wheel revolves.

The hopper is provided with an adjustable feed-slide, $e$, for regulating the discharge of the material therein to the shoe F.

G represents a coverer, removably or detachably secured to the rear end of the beam A by a bolt, and H H represent the handles of the machine, pivoted to the sides of the beam A, near the forward end thereof, and connected and supported in the rear by a cross-bar, $h$, and upright standard I, mortised in the rear end of the beam A, said handles and standard being, respectively, provided with a series of two or more holes, $h'$ $i$, by which the handles and cross-bar are adapted to be adjusted higher when the machine is used as a seed-drill, and lower when used as a fertilizer-distributer.

J represents legs, removably secured to the handles, for supporting the rear part of the machine when the coverer G is removed and the machine used as a fertilizer-distributer, but which can be readily removed when the machine is to be used as a seed-drill.

Figure 1 clearly represents the machine as adapted for use as a seed-drill, the seed from the hopper being delivered from the vibrating shoe into the furrow formed by the opener C, the furrow being subsequently covered by the coverer G.

Figure 2:
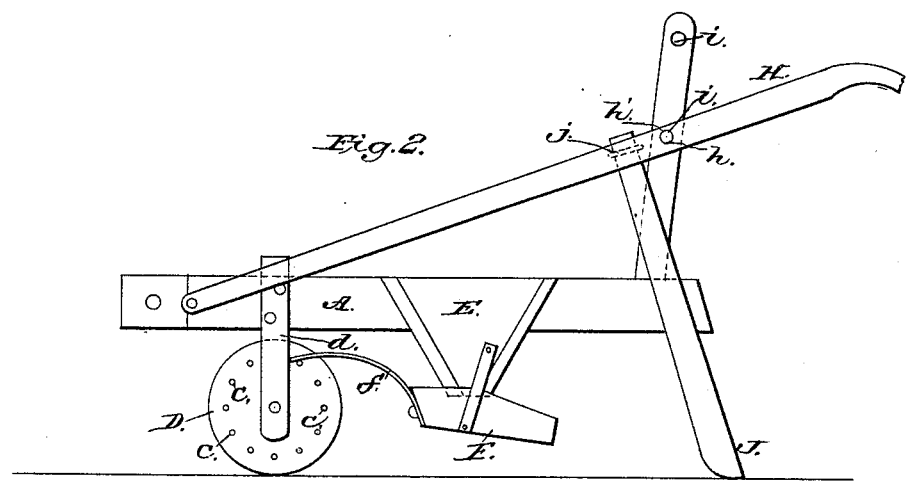

When it is desired to convert the machine into a fertilizer-distributer, the extension B, carrying the furrow-opener, and also the coverer G are removed. The handles are then lowered by disconnecting them from the cross-bar, placing the cross-bar in the lower hole of the standard, and connecting the handles again to the cross-bar through the forward holes in the handles, after which the legs J are secured in the staples $j$, when the machine is adapted as a fertilizer-distributer, all as clearly shown in Fig. 2.

Having thus fully described my invention, what I claim as new, and desire to secure by Letters Patent, is—

In a combined seed-drill and fertilizer-distributer, the combination, with the beam A, hopper E, vibrating shoe F, and ground-wheel D, of the removable extension B, provided with the furrow-opener C, the removable coverer G, removable legs J, and adjustable handles H, the several parts constructed and relatively arranged as herein shown and described, whereby the machine is adapted to be converted into a corn-planter or fertilizer-distributer, substantially as specified.

In testimony that I claim the foregoing as my own I hereby affix my signature in presence of two witnesses.

ELIJAH P. HOLLIS.

Witnesses:
   M. E. ROBINETT,
   E. L. LITTON.